United States Patent
van Wageningen et al.

(10) Patent No.: US 12,212,157 B2
(45) Date of Patent: Jan. 28, 2025

(54) WIRELESS POWER TRANSFER

(71) Applicant: KONINKLIJKE PHILIPS N.V., Eindhoven (NL)

(72) Inventors: Dries van Wageningen, Limburg (NL); Antonius Adriaan Maria Staring, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 49 days.

(21) Appl. No.: 17/909,836

(22) PCT Filed: Mar. 3, 2021

(86) PCT No.: PCT/EP2021/055248
§ 371 (c)(1),
(2) Date: Sep. 7, 2022

(87) PCT Pub. No.: WO2021/180526
PCT Pub. Date: Sep. 16, 2021

(65) Prior Publication Data
US 2023/0107009 A1 Apr. 6, 2023

(30) Foreign Application Priority Data

Mar. 10, 2020 (EP) .................................. 20161951

(51) Int. Cl.
*H02J 50/60* (2016.01)
*H02J 50/80* (2016.01)

(52) U.S. Cl.
CPC ............. *H02J 50/60* (2016.02); *H02J 50/80* (2016.02)

(58) Field of Classification Search
CPC ............. H02J 50/10; H02J 50/60; H02J 50/80
(Continued)

(56) References Cited

U.S. PATENT DOCUMENTS

| | | |
|---|---|---|
| 7,554,316 B2 | 6/2009 | Stevens et al. |
| 9,716,388 B2 | 7/2017 | Van Wageningen |
| | (Continued) | |

FOREIGN PATENT DOCUMENTS

| | | |
|---|---|---|
| EP | 3528364 A1 | 8/2019 |
| EP | 3528365 A1 | 8/2019 |
| | (Continued) | |

OTHER PUBLICATIONS

The Qi Wireless Power Transfer System, Power Class 0 Specification, parts 1 and 2: Interface Definitions, Version 1.2.4, Feb. 2018.
(Continued)

*Primary Examiner* — Hal Kaplan

(57) ABSTRACT

A power transmitter (101) comprises a transmitter coil (103) for generating the power transfer signal during a power transfer phase. A driver (201) generates a drive signal for the transmitter coil (103) to generate the power transfer signal during the power transfer phase. A communicator (205) receives messages from the power receiver (105) and a controller (203) is arranged to, during the power transfer phase, generate a reduced power time interval during which a power level of the power transfer signal is reduced where the reduced power time interval is generated in response to the communicator (205) receiving a reduced power time interval request message from the power receiver (105). The power receiver (105) may generate a request message when e.g. a change in operating mode occurs. The power receiver (105) may ensure that a request message, and thus a reduced power time interval, is only generated when the power receiver can handle a power interruption for the power transfer signal.

26 Claims, 8 Drawing Sheets

(58) Field of Classification Search
USPC .......................................................... 307/104
See application file for complete search history.

(56) References Cited

U.S. PATENT DOCUMENTS

| | | |
|---|---|---|
| 10,103,584 B2 | 10/2018 | Van Wageningen |
| 10,615,646 B2 | 4/2020 | Staring et al. |
| 10,879,744 B2 | 12/2020 | Van Wageningen et al. |
| 11,038,381 B2 | 6/2021 | Van Wageningen et al. |
| 11,303,152 B2 | 4/2022 | Ettes et al. |
| 2016/0301261 A1 | 10/2016 | Schorpp |
| 2019/0260359 A1* | 8/2019 | Alarcon Cot ............. H03J 5/00 |
| 2020/0014209 A1 | 1/2020 | Chazottes |
| 2020/0014249 A1 | 1/2020 | Gonda et al. |
| 2020/0212725 A1* | 7/2020 | Van Wageningen .... H02J 50/60 |
| 2020/0280220 A1 | 9/2020 | Ettes et al. |
| 2020/0395793 A1 | 12/2020 | Ettes et al. |

FOREIGN PATENT DOCUMENTS

| | | |
|---|---|---|
| EP | 3570410 A1 | 11/2019 |
| WO | 2016091764 A1 | 6/2016 |
| WO | 2018219793 A1 | 12/2018 |

OTHER PUBLICATIONS

International Search Report and Written Opinion from PCT/EP2021/055248 mailed on Sep. 16, 2021.

* cited by examiner

|     | b7 | b6 | b5 | b4 | b3 | b2 | b1 | b0 |
|-----|----|----|----|----|----|----|----|----|
| B0  | Reserved | | | | | Mode | | |
| B1  | (MSB) Received Power Value | | | | | | | |
| B2  | | | | | | | | (LSB) |

FIG. 8

WIRELESS POWER TRANSFER

CROSS-REFERENCE TO PRIOR APPLICATIONS

This application is the U.S. National Phase application under 35 U.S.C. § 371 of International Application No. PCT/EP2021/055248, filed on Mar. 3, 2021, which claims the benefit of EP Patent Application No. EP 20161951.7, filed on Mar. 10, 2020. These applications are hereby incorporated by reference herein.

FIELD OF THE INVENTION

The invention relates to wireless power transfer and in particular, but not exclusively, to foreign object detection in a wireless power transfer system.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter inductor in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index.html, where in particular the defined Specification documents can be found.

In power transfer systems, such as Qi, the electromagnetic field generated to in order to transfer the required levels of power to the power receiver is often very substantial. The presence of such a strong field may in many situations have an impact on the surroundings.

For example, a potential problem with wireless power transfer is that power may unintentionally be transferred to e.g. metallic objects that happen to be in the vicinity of the power transmitter. For example, if a foreign object, such as e.g. a coin, key, ring etc., is placed upon the power transmitter platform arranged to receive a power receiver, the magnetic flux generated by the transmitter coil will introduce eddy currents in the metal objects which will cause the objects to heat up. The heat increase may be very significant and may be highly disadvantageous.

In order to reduce the risk of such scenarios arising, it has been proposed to introduce foreign object detection where the power transmitter can detect the presence of a foreign object and reduce the transmit power and/or generate a user alert when a positive detection occurs. For example, the Qi system includes functionality for detecting a foreign object, and for reducing power if a foreign object is detected. Specifically, Qi specification version 1.2.1, section 11 describes various methods of detecting a foreign object.

One method to detect such foreign objects is disclosed in WO 2012127335 which discloses an approach based on determining unknown power losses. In the approach, both the power receiver and the power transmitter measure their power, and the receiver communicates its measured received power to the power transmitter. When the power transmitter detects a significant difference between the power sent by the transmitter and the power received by the receiver, an unwanted foreign object may potentially be present, and the power transfer may be reduced or aborted for safety reasons. This power loss method requires synchronized accurate power measurements performed by the power transmitter and the power receiver.

For example, in the Qi power transfer standard, the power receiver estimates its received power e.g. by measuring the rectified voltage and current, multiplying them and adding an estimate of the internal power losses in the power receiver (e.g. losses of the rectifier, the receiver coil, metal parts being part of the receiver etc.). The power receiver reports the determined received power to the power transmitter with a minimum rate of e.g. every four seconds.

The power transmitter estimates its transmitted power, e.g. by measuring the DC input voltage and current of the inverter, multiplying them and correcting the result by subtracting an estimation of the internal power losses in the transmitter, such as e.g. the estimated power loss in the inverter, the primary coil, and metal parts that are part of the power transmitter.

The power transmitter can estimate the power loss by subtracting the reported received power from the transmitted power. If the difference exceeds a threshold, the transmitter will assume that too much power is dissipated in a foreign object, and it can then proceed to terminate the power transfer.

Alternatively, it has been proposed to measure the quality or Q-factor of the resonant circuit formed by the primary and secondary coils together with the corresponding capacitances and resistances. A reduction in the measured Q-factor may be indicative of a foreign object being present.

In practice, it tends to be difficult to achieve sufficient detection accuracy using the methods described in the Qi specification. This difficulty is exacerbated by a number of uncertainties about the specific current operating conditions.

For example, a particular problem is the potential presence of friendly metals (i.e. metal parts of the device that embodies the power receiver or the power transmitter) as the magnetic and electrical properties of these may be unknown (and vary between different devices) and therefore may be difficult to compensate for.

Further, undesirable heating may result from even relatively small amounts of power being dissipated in a metallic foreign object. Therefore, it is necessary to detect even a small power discrepancy between the transmitted and received power, and this may be particularly difficult when the power levels of the power transfer increase.

The Q factor degradation approach may in many scenarios have a better sensitivity for detecting the presence of metal objects. However, it may still not provide sufficient accuracy and e.g. may also suffer from the influence of friendly metal.

The performance of the foreign object detection is subject to the specific operating conditions that are present when the test is actually performed. For example, if, as described in the Qi specification, a measurement for foreign object detection is performed in the Selection Phase of a power transfer initialization process, the signal that the power transmitter provides for the measurement must be small enough to prevent that it wakes up the power receiver. However, for such a small signal, the signal/noise ratio is typically poor, resulting in reduced accuracy of the measurement.

The requirement for a small measurement signal may result in other disadvantageous effects. A power receiver exposed to a small measurement signal may exhibit a leakage current that depends on the level of the measurement signal, the coupling between the primary and secondary coil, and the charging state of a capacitor at the output of the rectifier. This leakage current can therefore be different depending on the actual conditions. Since leakage current influences the reflected impedance at the power transmitter coil, the measurement of the quality factor will also depend on the specific current conditions.

Another issue is that foreign object detection is typically a very sensitive test where it is desired that relatively small changes caused by the presence of a foreign object is detected in an environment with possibly a large variation of the operating conditions and scenarios for which the test is being performed.

Accordingly, current algorithms tend to be suboptimal and may in some scenarios and examples provide less than optimum performance. In particular, they may result in the presence of foreign objects not being detected, or in false detections of foreign objects when none are present.

The difficulties of accurate foreign object detection are particularly significant in scenarios wherein the power level of the power transfer signal is high and/or when it varies. Thus, foreign object detection is particularly difficult during the power transfer phase, and especially for power receivers that represent a large and varying load.

Other operations of the power transfer system may furthermore be sensitive to such effects. For example, in many situations, communication between the power transmitter and power receiver may be negatively affected by large loads, and in particular by large load variations.

In many systems, communication from the power receiver to the power transmitter may use load modulation where a load of the power transfer signal is varied in dependence on the data to be transmitted. However, such load modulation may be difficult to detect if the power transfer loading of the power transfer signal varies at the same time. Similarly, communication from the power transmitter to the power receiver may be achieved by modulating the power transfer signal (e.g. amplitude or frequency modulation) but interference to such modulation may be caused by variations in the parameters of the power transfer signal due to a varying load.

Indeed, even if a completely separate carrier is used for communication, such as an NFC communication link, a very large and varying electromagnetic field caused by the power transfer signal may cause substantial interference despite being in a very different frequency band.

Thus, the presence of the power transfer signal, and the loading thereof, may have detrimental impact on other operations, such as foreign object detection and communication operations.

In order to improve foreign object detection, WO18219793A1 discloses that a repeating time frame is imposed on the power transfer signal. The repeating time frame is divided into a power transfer time interval and a foreign object detection time interval. In the approach, the power transfer is switched off during the foreign object detection time intervals and the foreign object detection is performed using a dedicated foreign object detection signal.

However, whereas this may provide improved performance in many situations, it does not provide optimal performance in all situations or for all operations. It may for example in many approaches result in reduced power transfer levels and/or efficiency. The interrupted power transfer may also impose substantial constraints on the design of the power receiver as this is required to operate with an interrupted power supply while often being required to provide a continuous power to a load.

Hence, an improved operation for a power transfer system would be advantageous, in particular, an approach allowing increased flexibility, reduced cost, reduced complexity, improved operation for operations of the power transfer system, improved foreign object detection, improved communication, improved adaptability, backwards compatibility, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for wirelessly providing power to a power receiver via an inductive power transfer signal; the power transmitter comprising: a transmitter coil for generating the power transfer signal during a power transfer phase; a driver for generating a drive signal for the transmitter coil to generate the power transfer signal during the power transfer phase; a first communicator for receiving messages from the power receiver; and a controller arranged to, during the power transfer phase, generate a reduced power time interval during which a power level of the power transfer signal is reduced, the controller being arranged to generate the reduced power time interval in response to receiving a reduced power time interval request message from the power receiver.

The invention may provide improved performance in many embodiments, and may provide an overall improved power transfer operation in many systems and embodiments. For example, in many embodiments, improved foreign object detection and/or communication may be achieved by performing these operations during time intervals created to provide particularly advantageous conditions for such operations.

The approach may provide a highly flexible approach with the power receiver being in control of the generation of the reduced power time intervals. This may for example allow improved reliability of the transfer and may allow the power receiver to ensure that power can be provided to a load during reduced power time intervals or that e.g. a reduced power to a load can be tolerated. The approach may ensure that reduced power time intervals are only used when this does not prevent acceptable support of the load by the power receiver.

During the reduced power time interval, the power level of the power transfer signal is reduced corresponding to the level of power being transferred from the power transmitter to the power receiver being reduced. During the reduced power time interval, a power level of power transferred from the power transmitter to the power receiver is reduced relative to a power level of power transferred from the power transmitter to the power receiver during a power transfer time interval adjacent to the reduced power time interval. The power level, and references to power and power level, may specifically be considered to relate to the real power (I·U·Cos φ). In many embodiments, the power transmitter may be arranged to not provide a drive signal to the transmitter coil during a reduced power time interval.

In accordance with an optional feature of the invention, the power transmitter further comprises a foreign object detector for performing foreign object detection, the foreign object detection being arranged to perform a foreign object detection test during the reduced power time interval.

The approach may provide improved foreign object detection and may allow this to be adapted to the specific power receiver preferences or requirements, such as e.g. timing accurate foreign object detections to be performed when impact on the power transfer can be reduced or minimized.

In accordance with an optional feature of the invention, the power transmitter further comprises a reliability circuit which is arranged to determine a reliability measure for the foreign object detection.

This may provide improved operation in many embodiments.

The reliability measure may be indicative of a reliability of the foreign object detection test and specifically may be indicative of reliability/certainty/confidence of the foreign object detection test result.

In accordance with an optional feature of the invention, the reliability circuit is arranged to transmit a foreign object detection result to the power receiver in response to a determination that the reliability measure for the foreign object detection test meets a reliability criterion.

The foreign object detection result may be an indication of whether a foreign object is detected or not. The reliability criterion may be a criterion indicating that the reliability/confidence of the foreign object detection result is higher than if the criterion is not met.

In accordance with an optional feature of the invention, the reliability circuit is arranged to transmit a request for one or more reduced power time intervals to the power receiver in response to a determination that the reliability measure for the foreign object detection test does not meet a reliability criterion.

This may provide improved performance and may for example allow the system to proceed to perform more reliable foreign object detection by using a plurality of reduced power time intervals. The approach further allows the power receiver to retain control of the operation and when such foreign object detection tests may be performed.

In accordance with an optional feature of the invention, the reliability circuit is arranged to transmit a request for at least one more reduced power time interval to the power receiver in response to the foreign object detection test.

In some embodiments, the power transmitter further comprises a calibrator for performing a calibration of the foreign object detection, the calibration being dependent on the foreign object detection test.

This may provide improved performance in many embodiments and may allow improved foreign object detection adaptation/calibration as this can be performed with high confidence that no foreign object is present.

In some embodiments, the power transmitter may comprise a calibrator for performing a calibration of the foreign object detection, the calibration being dependent on whether the foreign object detection test has detected a foreign object.

In some embodiments, the power transmitter may comprise calibrator for performing a calibration of the foreign object detection, the calibration being performed only if the foreign object detection test is indicative of no foreign object being present.

In some embodiments, the calibrator is arranged to perform the calibration in response to the reliability measure.

This may provide improved performance and more reliable adaptation and calibration of the foreign object detection. For example, a degree of adaptation by the calibration may be dependent on the reliability measure. A higher degree of adaptation by the calibration may be performed for an increasing reliability measure. In some embodiments, foreign object detection calibration may only be performed if the reliability measure meets a reliability criterion (and typically if the result is that no foreign object is present). The reliability criterion may be a criterion indicating that the reliability/confidence of the foreign object detection result is higher than if the criterion is not met.

In some embodiments, the foreign object detection is arranged to perform foreign object detection using a first foreign object detection algorithm during the reduced power time interval and to perform foreign object detection using a different second foreign object detection algorithm during a power transfer time interval being disjoint with the reduced power time interval, and wherein the calibrator is arranged to calibrate the second foreign object detection algorithm.

This may provide for efficient, accurate, and reliable adaptation/calibration of the foreign object detection performed during power transfer.

The first foreign object detection algorithm may be more accurate than the second foreign object detection algorithm. The first foreign object detection algorithm may be dependent on the power transfer signal not being present or having a power level below a given threshold whereas the second foreign object detection algorithm may not be based on such assumptions.

In some embodiments, the foreign object detection test includes determining whether a foreign object is present in response to a decay time property for a signal level for at least one of a current and a voltage of a resonance circuit comprising the transmitter coil.

Such an approach may provide particularly advantageous operation and may in particular be highly suitable for very short reduced power time interval where the power transfer signal may be switched off completely.

In accordance with an optional feature of the invention, the first communicator is arranged to communicate with the power receiver during the reduced power time interval.

In accordance with an optional feature of the invention, the first communicator is arranged to communicate with the power receiver using a communication carrier different from the power transfer signal.

The communication carrier may be for a separate independent communication system, such as e.g. an NFC communication system.

In accordance with an optional feature of the invention, the reduced power time interval request message is a dedicated message for the purpose of requesting the reduced power time interval.

In accordance with an optional feature of the invention, the reduced power time interval request message is a message comprising other data for the power transfer, the data including data for a power transfer operation performed outside of the reduced power time interval.

The reduced power time interval request message may specifically be a power control message also used for providing feedback to the power control loop of the power transfer.

In some embodiments, the reduced power time interval request message is a power control message comprising control data for a power control loop for the power transfer signal.

In accordance with an optional feature of the invention, the reduced power time interval request message is a power feedback message comprising data indicative of a power level extracted by the power receiver.

The power feedback message may specifically be a received power data packet.

In accordance with an optional feature of the invention, the reduced power time interval request message is a reserved field of a received power data packet.

In accordance with an optional feature of the invention, the received power data packet further comprises at least one of a reduced power time interval start time and a reduced power time interval duration.

In accordance with an optional feature of the invention, the reduced power time interval request message comprises a data field for requesting a mode of operation for the power transfer out of a set of modes of operation, the set of modes of operation including a reduced power time interval mode of operation.

In some embodiments, the power transmitter is arranged to generate only one reduced power time interval for each reduced power time interval request message In some embodiments, the power transmitter is arranged to generate a plurality of reduced power time interval in response to receiving the reduced power time interval request message In some embodiments, the reduced power time interval request message comprises a timing indication for the reduced power time interval and the controller is arranged to adapt the timing of the reduced power time interval in response to the timing indication.

In some embodiments, the reduced power time interval request message comprises an indication of a number of reduced power time intervals and the controller is arranged to select a number of reduced power time interval to generate in response to receiving the reduced power time interval request message based on the number indication.

In some embodiments, the first communicator is arranged to receive a second reduced power time interval request message in response to transmitting a response message to the power receiver indicating that the reliability measure does not meet a reliability criterion.

In some embodiments, the power transmitter is arranged to cause power receiver to decouple the load during the reduced power time interval.

In accordance with an optional feature of the invention, the reduced power time interval has a duration of no more than 500 microseconds.

In accordance with an optional feature of the invention, the power transmitter further comprises an initialization processor 203A arranged to initialize the power transfer phase prior to the start of the power transfer phase, the initialization processor 203A being arranged to determine a property of the reduced power time interval in response to a communication with the power receiver, and the controller is arranged to generate a reduced power time interval to have the property In accordance with an aspect of the invention, there is provided a wireless power transfer system comprising a power transmitter according to the above descriptions and the power receiver, the power receiver comprising: a coil for extracting power from the power transfer signal; a power circuit for providing power extracted from the power transfer signal to a load; a second communicator arranged to transmit the reduced power time interval request message to the power transmitter.

In accordance with an optional feature of the invention, the second communicator is arranged to transmit the reduced power time interval request message to the power transmitter in response to a change in at least one of a power being extracted from the power transfer signal, current being provided to the load, and a voltage being provided to the load.

In accordance with an optional feature of the invention, the second communicator is arranged to receive a reliability indication from the power transmitter, the reliability indication being indicative of a reliability for a foreign object detection test performed during a reduced power time interval, and wherein the second communicator is arranged to transmit a further reduced power time interval request message in response to a determination that the reliability indication does not meet a reliability criterion.

The reliability criterion may be a criterion indicating that the reliability/confidence of the foreign object detection result is higher than if the criterion is not met.

In accordance with an optional feature of the invention, the second communicator is arranged to receive a reliability indication from the power transmitter, the reliability indication being indicative of a reliability for a foreign object detection test performed during a reduced power time interval, and wherein the power receiver is arranged to perform a calibration of a received power level measurement in response to a determination that the reliability indication meets a reliability criterion.

In some embodiments, the power transmitter may transmit an indication of a transmitted power estimate to the power receiver, and the power receiver may be arranged to perform the calibration of the received power level measurement in response to the indication of the transmitted power estimate.

The reliability criterion may be a criterion indicating that the reliability/confidence of the foreign object detection result is higher than if the criterion is not met.

In some embodiments, the second communicator is arranged to transmit a second reduced power time interval request message in response to receiving a response message from the power transmitter that the reliability measure does not meet a reliability criterion.

In some embodiments, the power receiver is arranged to decouple the load from the receiver coil during the reduced power time interval.

In accordance with an optional feature of the invention, the power transmitter is arranged to transmit an indication of a suspected detection of a foreign object, and the power receiver may be arranged to transmit the request for a reduced power time interval in response to receiving the indication of a suspected detection of the foreign object from the power transmitter.

In some embodiments, the second communicator is arranged to communicate with the power transmitter during the reduced power time interval.

In some embodiments, the second communicator is arranged to communicate with the power transmitter using a communication carrier different from the power transfer signal.

In accordance with an aspect of the invention, there is provided a method of operation for a power transmitter wirelessly providing power to a power receiver via an inductive power transfer signal; the method comprising: a transmitter coil generating the power transfer signal during a power transfer phase; generating a drive signal for the transmitter coil to generate the power transfer signal during the power transfer phase; receiving messages from the power receiver during the power transfer phase; and generating, during the power transfer phase, a reduced power time interval during which a power level of the power transfer signal is reduced, the controller being arranged to generate the reduced power time interval in response to receiving a reduced power time interval request message from the power receiver.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which

FIG. 8 illustrates an example of a message format for a message used in a wireless power transfer system in accordance with some embodiments of the invention.

DETAILED DESCRIPTION OF THE EMBODIMENTS

The following description focuses on embodiments of the invention applicable to a wireless power transfer system utilizing a power transfer approach such as known from the Qi specification. However, it will be appreciated that the invention is not limited to this application but may be applied to many other wireless power transfer systems.

Figure 1:
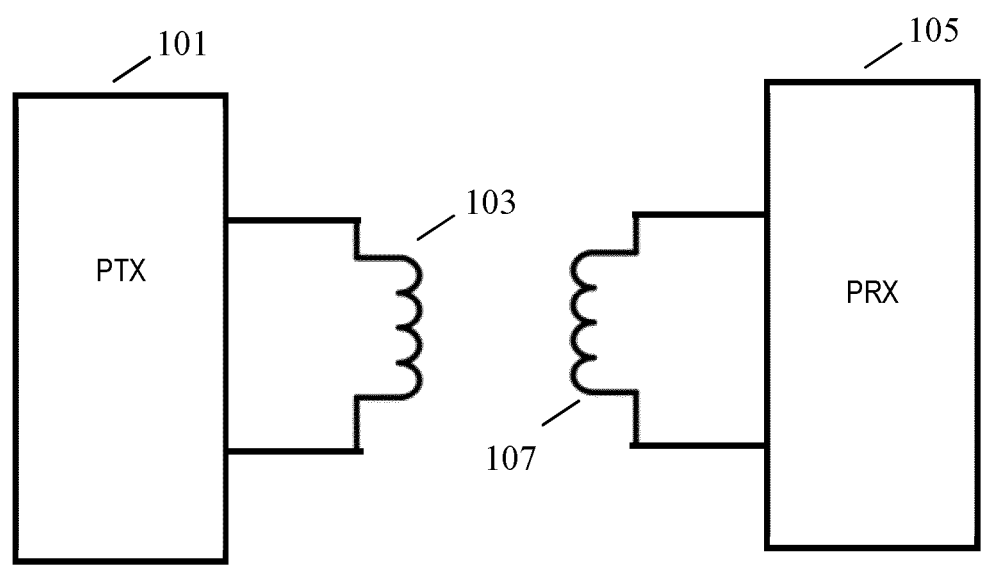
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides an electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103. The power transfer signal may correspond to the electromagnetic power transfer component representing the energy transfer from the power transmitter to the power receiver, and may be considered to correspond to the component of the generated electromagnetic field that transfers power from the power transmitter to the power receiver. For example, if there is no loading of the receive coil 107, no power will be extracted by the power receiver from the generated electromagnetic field (apart from losses). In such a scenario, the driving of the transmitter coil 103 may generate an electromagnetic field of potentially high field strength but the power level of the power transfer signal will be zero (apart from losses). In some situations, where a foreign object is present, the power transfer signal may be considered to include a component corresponding to the power transfer to the foreign object, and thus the power transfer signal may be considered to correspond to the power being extracted from the electromagnetic field generated by the power transmitter.

The power transfer signal may typically have a frequency between around 20 kHz to around 500 kHz, and often for Qi compatible systems typically in the range from 95 kHz to 205 kHz (or e.g. for high power kitchen applications, the frequency may e.g. typically be in the range between 20 kHz to 80 kHz). The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiver 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal), but it will be appreciated that by equivalence it may also be considered and used as a reference to an electrical signal provided to the transmitter coil 103 or picked up by the power receiving coil 107.

In the example, the power receiver 105 is specifically a power receiver that receives power via the receiver coil 107. However, in other embodiments, the power receiver 105 may comprise a metallic element, such as a metallic heating element, in which case the power transfer signal directly induces eddy currents resulting in a direct heating of the element.

The system is arranged to transfer substantial power levels, and specifically the power transmitter may support power levels in excess of 500 mW, 1 W, 5 W, 50 W, 100 W or 500 W in many embodiments. For example, for Qi corresponding applications, the power transfers may typically be in the 1-5 W power range for low power applications (the basic power profile), up to 15 W for Qi specification version 1.2, in the range up to 100 W for higher power applications such as power tools, laptops, drones, robots etc., and in excess of 100 W and up to more than 1000 W for very high-power applications, such as e.g. kitchen applications.

In the following, the operation of the power transmitter 101 and the power receiver 105 will be described with specific reference to an embodiment generally in accordance with the Qi Specification (except for the herein described (or consequential) modifications and enhancements) or suitable for the higher power kitchen specification being developed by the Wireless Power Consortium. In particular, the power transmitter 101 and the power receiver 105 may follow, or substantially be compatible with, elements of the Qi Specification version 1.0, 1.1 or 1.2 (except for the herein described (or consequential) modifications and enhancements).

In the following, the operation of the system of FIG. 1 will be described with specific focus on foreign object detection.

In wireless power transfer systems, the presence of an object (typically a conductive element extracting power from the power transfer signal and not being part of the power transmitter 101 or the power receiver 105, i.e. being an unintended, undesired, and/or interfering element to the power transfer) may be highly disadvantageous during a power transfer. Such an undesired object is in the field known as a foreign object.

A foreign object may not only reduce efficiency by adding a power loss to the operation but may also degrade the power transfer operation itself (e.g. by interfering with the power transfer efficiency or extracting power not directly controlled e.g. by the power transfer loop). In addition, the induction of currents in the foreign object (specifically eddy currents in the metal part of a foreign object) may result in an often highly undesirable heating of the foreign object.

In order to address such scenarios, wireless power transfer systems such as Qi include functionality for foreign object detection. Specifically, the power transmitter comprises functionality seeking to detect whether a foreign object is present. If so, the power transmitter may e.g. terminate the power transfer or reduce the maximum amount of power that can be transferred.

Current approaches proposed by the Qi Specifications are mainly based on detecting a power loss (by comparing the transmitted and the reported received power) or detecting degradations in the quality Q of the output resonance circuit. However, in current use these approaches have been found to provide suboptimal performance in many scenarios, and they may specifically lead to inaccurate detection resulting in missed detections and/or false positives where a foreign object is detected despite no such object being present.

Foreign object detection may be performed before a power receiver enters the power transfer phase (e.g. during the initialization of the power transfer) or during the power transfer phase. Detection during the power transfer phase is often based on comparisons of measured transmitted power and received power whereas detection that take place before the power transfer phase is often based on measurements of a reflected impedance, e.g. by measuring the quality factor of the transmitter coil by using a small measurement signal.

Figure 2:
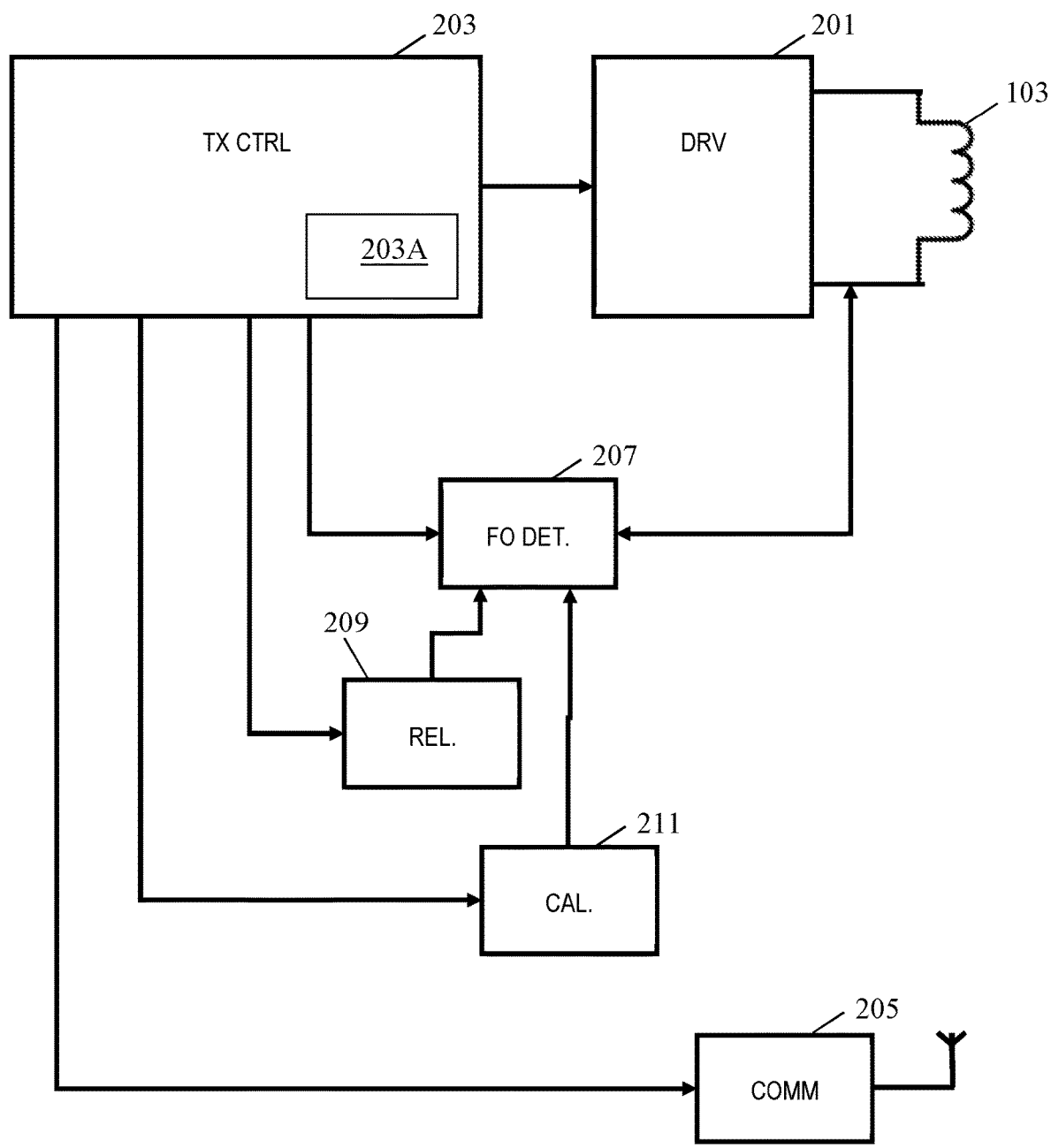
FIG. 2 illustrates an example of elements of a power transmitter in accordance with some embodiments of the invention.

FIG. 2 illustrates an example of a power transmitter in accordance with some embodiments of the invention.

The power transmitter 101 includes a driver 201 which can generate a drive signal that is fed to the transmitter coil 103 which in return generates the electromagnetic power transfer signal, which can provide a power transfer to the power receiver 105. The power transfer signal is provided during power transfer time intervals of the power transfer phase.

The driver 201 may typically comprise an output circuit in the form of an inverter, typically formed by driving a full or half bridge as will be well known to the skilled person.

The power transmitter 101 further comprises a power transmitter controller 203 which is arranged to control the operation of the power transmitter 101 in accordance with the desired operating principles. Specifically, the power transmitter 101 may include many of the functionalities required to perform power control in accordance with the Qi Specifications.

The power transmitter controller 203 is in particular arranged to control the generation of the drive signal by the driver 201, and it can specifically control the power level of the drive signal, and accordingly the level of the generated power transfer signal. The power transmitter controller 203 comprises a power loop controller controlling a power level of the power transfer signal in response to the power control messages received from the power receiver 105 during the power control phase.

In order to receive data and messages from the power receiver 105, the power transmitter 101 comprises a first communicator 205 which is arranged to receive data and messages from the power receiver 105 (as will be appreciated by the skilled person, a data message may provide one or more bits of information). In the example, the power receiver 105 is arranged to load modulate the power transfer signal generated by the transmitter coil 103, and the first communicator 205 is arranged to sense variations in the voltage and/or current of the transmitter coil 103 and to demodulate the load modulation based on these. The skilled person will be aware of the principles of load modulation, as e.g. used in Qi wireless power transfer systems, and therefore these will not be described in further detail.

In many embodiments, the first communicator 205 may also be arranged to transmit data to the power receiver 105, e.g. by modulating the power transfer signal as will be well known to the person skilled in the art.

In some embodiments, communication may be performed using a separate communication channel which may be achieved using a separate communication coil, or indeed using the transmitter coil 103. For example, in some embodiments Near Field Communication (NFC) may be implemented or a high frequency carrier (e.g. with a carrier frequency of 13.56 MHz) may be overlaid on the power transfer signal.

Figure 3:
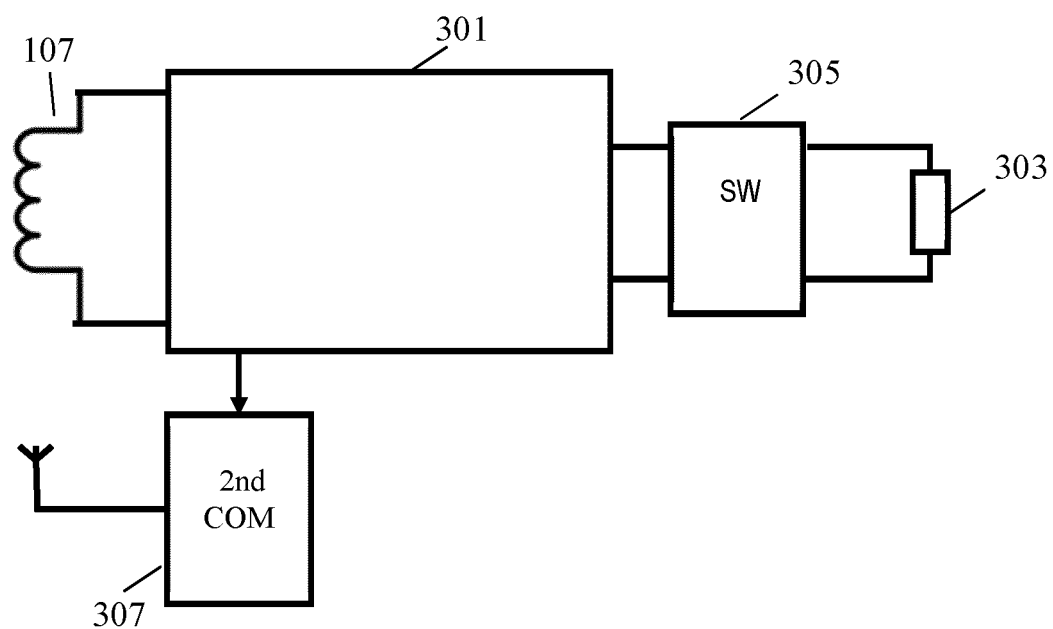
FIG. 3 illustrates an example of elements of a power receiver in accordance with some embodiments of the invention.

FIG. 3 illustrates some exemplary elements of the power receiver 105.

The receiver coil 107 is coupled to a power receiver controller 301 which couples the receiver coil 107 to a load 303 via a switch 305 (i.e. it is a switchable load 305). The power receiver controller 301 includes a power control path which converts the power extracted by the receiver coil 107 into a suitable supply for the load. In addition, the power receiver controller 301 may include various power receiver controller functionality required to perform power transfer, and in particular functions required to perform power transfer in accordance with the Qi specifications.

In order to support communication from the power receiver 105 to the power transmitter 101 the power receiver 105 comprises a second communicator 307. The second communicator 307 may specifically be a load modulator arranged to vary the loading of the receiver coil 107 in response to data to be transmitted to the power transmitter 101. The load variations are then detected and demodulated by the power transmitter 101 as will be known to the person skilled in the art.

In many embodiments, the second communicator 307 may further be arranged to receive data from the power transmitter 101, for example by demodulating a modulation of the power transfer signal as will be known to the person skilled in the art.

In many embodiments, the second communicator 307 is arranged to communicate without using the power transfer signal and specifically it may be for a separate communication system, e.g. it may be an NFC communication unit.

In accordance with many embodiments, the power transmitter 101 further comprises a foreign object detector 207 which is arranged to perform foreign object detection tests, i.e. to specifically detect whether any undesired conductive elements are likely to be present within the generated electromagnetic field.

In the system, some (or possibly all) foreign object detection tests are based on measurements performed during reduced power time intervals which when used for the purpose of foreign object detection may also be referred to as foreign object detection time intervals. During these foreign object detection time intervals, the transmitter controller 203 is arranged to reduce the power level of the power transfer signal. Indeed, in some embodiments, the power transmitter 101 may use different coils for generating the power transfer signal and for generating an electromagnetic test signal used for foreign object detection during the foreign object detection time intervals. In many embodiments, the power transmitter may switch the power transfer signal completely off during the foreign object detection time intervals.

During an interval in which foreign object detection is performed, i.e. during a foreign object detection time interval, the foreign object detector 207 may evaluate conditions to determine whether a foreign object is considered present or not.

For example, during the foreign object detection time interval, the power transmitter 101 may generate an electromagnetic test signal using a test signal coil which may be a dedicated test coil, and the foreign object detection may be based on evaluating characteristics and properties of this signal.

For example, the power level of (the power extracted from) the generated test signal may be used as an indication of the power being extracted by potential foreign objects. This may typically be done by comparing the actual extracted power to the expected power extraction from the test signal by the power receiver 105. The expected power extraction from the power receiver 105 may for example be an extracted power level reported from the power receiver.

In some embodiments, the power receiver 105 may be arranged to switch off any external load and the expected extracted power by the power receiver may simply be expected parasitic losses in the power receiver. In some cases, these may be estimated or even assumed to be substantially zero. In other embodiments, they may e.g. be estimated during normal operation in the power transfer phase (e.g. as a difference between the transmitted power and the reported received power compensated for the relative field strength level).

An advantage of implementing foreign object detection during a reduced power time interval is that the reduced power level, and specifically switching off the power transfer signal, may allow a more accurate and reliable foreign object detection test to be performed. The foreign object detection test may be based on assumptions that no strong electromagnetic power transfer signal is present or may be based on properties or conditions resulting from the switching off of the power transfer signal.

For example, in some embodiments, a separate dedicated electromagnetic test signal may be generated using a separate test coil. The test signal may be optimized for the foreign object detection test, such as e.g. by changing a test frequency to be different from the resonance frequency of the power transfer circuits comprising the transmitter coil 103 and the receiver coil 107 thereby minimizing the impact of these. This approach can be used without the power transfer signal interfering with the often sensitive measurements.

As a specific example, the foreign object detection test includes determining whether a foreign object is present in response to a decay rate property for a signal level for at least one of a current and a voltage of a resonance circuit comprising the transmitter coil. The foreign object detection may specifically be arranged to switch off the drive signal to the resonance circuit allowing the resonance circuit to resonate (freewheel). Due to losses this will result in a decay/reducing level of the current and voltage in the resonance circuit with the decay increasing for increasing losses. The decay performance, and decay rate, accordingly depends on the power extracted from the generated electromagnetic signal with the decay rate increasing for increasing extracted power. In some embodiments, a timing of the decay, such as e.g. the time for the voltage/current signal to reduce by a given amount, may accordingly be determined by the foreign object detection and used to determine whether a foreign object is estimated to be present or not. e.g. if the decay time or rate for a given reduction is less than a given threshold, the foreign object detection may determine that a foreign object is present.

Thus, in some embodiments, the presence of a foreign object can be detected by measuring the decay of a signal in an undriven resonance tank. U.S. Pat. No. 7,554,316B2 discloses decay measurements being performed and used to control power transfer operation.

Figure 4:
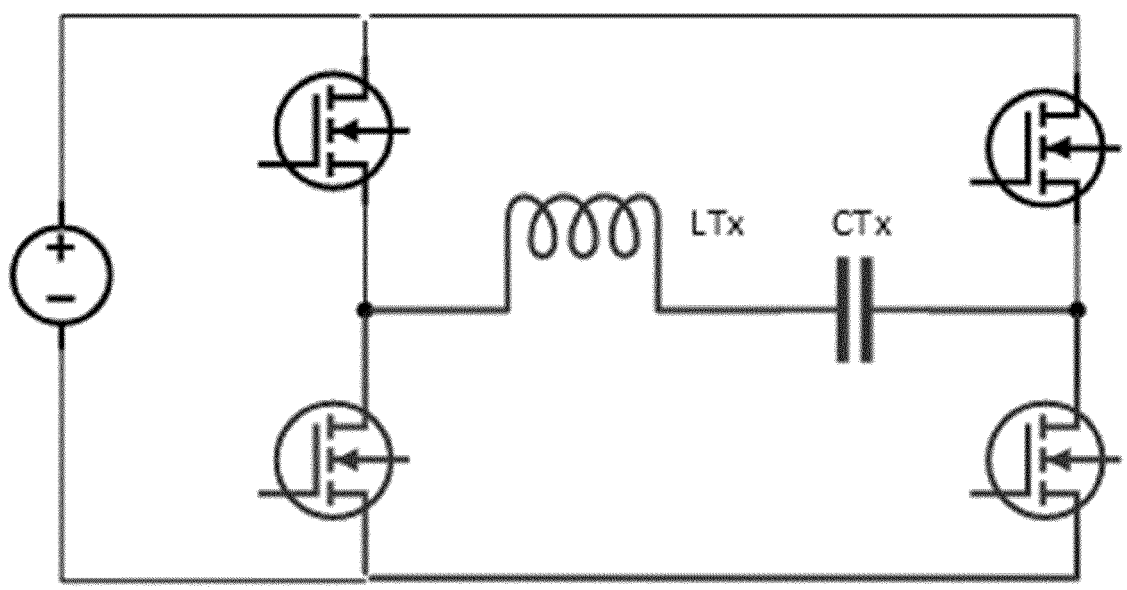
FIG. 4 illustrates an example of elements of a power transmitter in accordance with some embodiments of the invention.
Figure 5:
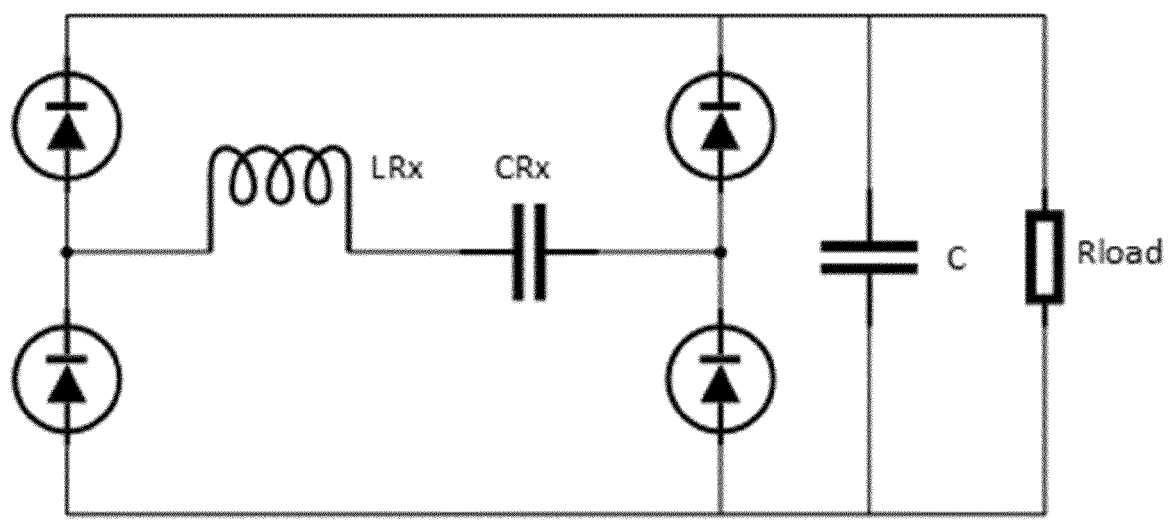
FIG. 5 illustrates an example of elements of a power receiver in accordance with some embodiments of the invention.

FIG. 4 illustrates an example of an output bridge of a driver driving an output resonance circuit comprising the transmitter coil 103, referred to as LTx. The power transmitter 101 contains a capacitor (CTx) in series with LTx to form the resonance circuit. This resonance circuit is driven by a full bridge inverter powered by a DC Voltage FIG. 5 illustrates a simplified schematic of core elements of a power transfer path for the power receiver 105. The power receiver also contains a capacitor CRx to form a resonance circuit with the receiver coil 107, referred to as LRx. The induced AC Voltage over this circuit is rectified by a full bridge rectifier and smoothed by a capacitor C. The load 303, referred to as Rload, is shown (simplified) as coupled over the capacitor C. The value of the capacitor C together with the resistance of the load Rload determine the ripple on the output voltage ($U_{out}$).

The power transmitter and the power receiver are inductively coupled via a transmitter coil LTx and a receiver coil LRx.

Figure 6:
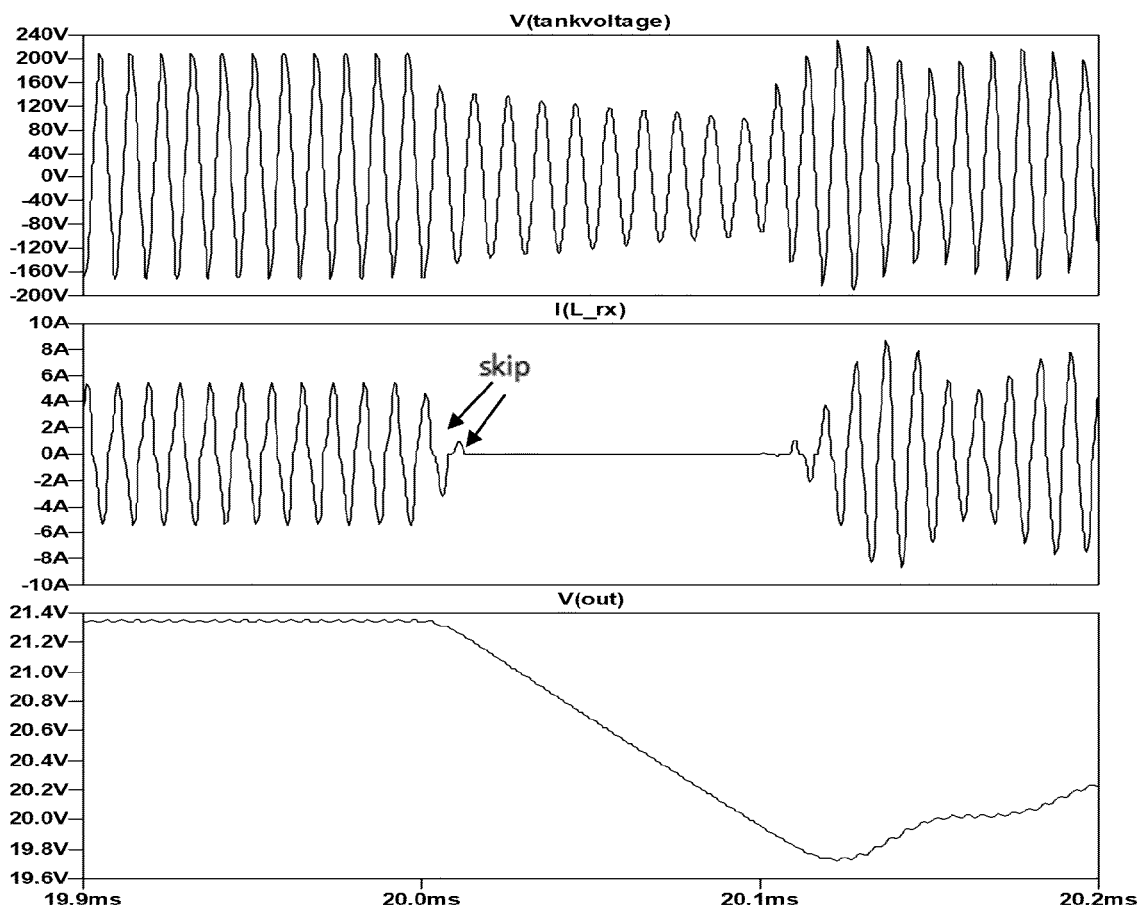
FIG. 6 illustrates an example of signals following switching off a power transfer signal in a wireless power transfer system in accordance with some embodiments of the invention.

FIG. 6 illustrates the effects that may occur when the inverter interrupts the driving of the resonance circuit of the power transmitter and short-cuts this.

As shown, the voltage $U_{tank}$ over the resonance circuit/tank decays over time.

Initially, the induced voltage at the receiver resonance tank is still sufficiently high for the rectifiers to conduct and a remaining current ILRx flows through the rectifier towards the capacitor. However, after extracting energy from the resonance circuits by the load of the power receiver extracting power, the induced voltage drops below that of the capacitor C and thus results in the effective disconnecting of the load. Thus, in this situation the load Rload is fed from the energy stored in the capacitor rather than in the resonance circuits.

This isolates the resonance circuits from the load and thus the decay performance is not dependent on the value of the load Rload. As such the relative dependence on other properties, and specifically on whether a foreign object is present or not, is higher.

In order for the effect of the load to be removed, the measurements of the decay rate may be delayed such that rectifiers are not conducting. Therefore, often the decay measurement starts after skipping the first cycles. During the decay measurement, the load therefore solely depends on the energy stored in C. The output voltage $U_{out}$ over the load drops depending on the value of C and $R_{load}$. To keep the required value of C relatively low and still prevent that $U_{out}$ remains high enough, the decay measurement time is preferably short.

Figure 7:
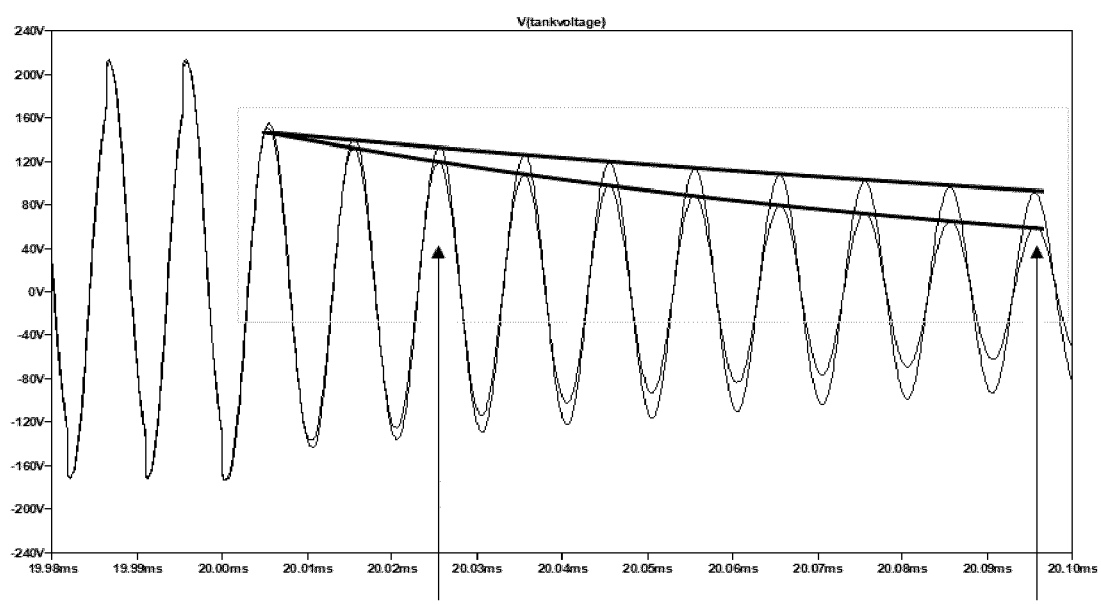
FIG. 7 illustrates an example of signals following switching off a power transfer signal in a wireless power transfer system in accordance with some embodiments of the invention.

FIG. 7 illustrates decay performance for $U_{tank}$ for two situations, one at which no foreign object is present and one at which a foreign object is present. The decay at presence of the foreign object is sharper/larger/faster than when no foreign object is present, i.e. the decay rate is larger. The amplitude of the voltage $U_{tank}$ can be described by the formula:

$$\frac{U(t)}{U(0)} = e^{-\frac{\omega}{2Q}t},$$

where

U(0)=amplitude of $U_{tank}$ at the start of the decay measurement

U(t)=amplitude of $U_{tank}$ at the end of the decay measurement

Q=quality of resonance circuit

Ω=angular frequency

Instead of measuring over a fixed time t, it is e.g. also possible to measure over a fixed number of resonance cycles (n). The amplitude of the $U_{tank}$ can be described by the formula:

$$\frac{U(nT)}{U(0)} = e^{-\frac{\pi}{Q}n},$$

where T is the resonance cycle time.

The approach of using reduced power time intervals in which the power transfer signal may be switched off allows or assists in using decay based foreign object detection. This is a substantial advantage in many systems and scenarios as the decay measurement has been found to provide a very accurate and reliable detection in many embodiments.

Advantages of the decay method include that the power transmitter does not need to drive the signal to a pre-defined value. E.g. It does not need to apply the resonance frequency as for the quality factor foreign object detection method. The power transmitter may simply switch from driven to undriven resonance tank without controlling the operating parameters to a pre-determined setting. E.g. it does not need to adapt the operating frequency. This allows for a shorter interruption of the power signal with the advantage of reducing disturbance of the functioning of the power receiver. A particular advantage of the approach is that it is particularly suited for very short foreign object detection time intervals.

Thus, in many situations and indeed for different operations, the use of reduced power time intervals may provide improved performance. However, the use of reduced power time intervals also provides a number of disadvantages as it requires the power receiver to be able to handle an interrupted power transfer. This may typically be handled by imposing a repeating time frame with one or more reduced power time intervals such that a predetermined duration of reduced power time intervals occur at periodic intervals. This allows the power receiver to be designed to cope with the interrupted power transfer, such as specifically by dimensioning an energy reservoir/capacitor to sustain the load during the interruptions.

However, in the described systems, the power receiver 105 is arranged to control the generation of reduced power time intervals and specifically is arranged to control whether a reduced power time interval is generated or not. Thus, rather than a predetermined or power transmitter controlled generation of reduced power time intervals, the power transmitter of the described systems may (possibly only) generate reduced power time intervals under the control of the power receiver and thus the power receiver controls when the reduced power time intervals are generated thereby allowing them to be generated when the power receiver can handle the interruption or is specifically in need of the advantage that can be provided by a reduced power time interval.

In particular, the power receiver 105 is arranged to transmit a request for a reduced power time interval during the power transfer phase and the power transmitter is arranged to, in response to receiving the request, generate a reduced power time interval during the power transfer phase. Thus, during the power transfer phase the power receiver can determine when a reduced power time interval is desired or allowed and can transmit a reduced power time interval request message to the power transmitter which will result in this being generated. In many embodiments, reduced power time intervals may be generated during the power transfer phase only in response to reduced power time interval request messages being received from the power receiver.

Thus, the power transmitter may generate a reduced power time interval in response to receiving a reduced power time interval request message from the power receiver where the reduced power time interval would not be generated if the reduced power time interval request message had not been received. The power receiver may in response to receiving a reduced power time interval request message from the power receiver generate a reduced power time interval that is not generated if the reduced power time interval request message from the power receiver is not received. The reduced power time interval thus only exists due to the power receiver transmitting the reduced power time interval request message. The generation of the reduced power time interval is in some embodiments conditional on a reduced power time interval request message being received from the power receiver.

The approach may allow an asynchronous, ad-hoc, power receiver controlled generation of reduced power time intervals during the power transfer phase. This may provide improved performance in many embodiments and may for example prevent that reduced power time intervals occur at unsuitable times. For example, it may allow the power receiver to ensure that the reduced power time interval do not occur at times where the power load is higher than nominal which could potentially result in the energy reservoir being insufficient for maintaining the voltage for the load. The approach may allow more flexibility in the design of the power receiver, such as for example allowing a capacitor being designed for nominal conditions rather than for extreme worst case situations.

The approach may avoid a number of disadvantages and risks associated with the power transmitter being in control of when reduced power time intervals are generated. It may for example allow improved communication from the power receiver to the power transmitter as the power receiver can control when communication interference is not present. This may prevent e.g. control error messages not being properly received leading to reduced power control performance. Similarly, received power messages may not arrive/may not be decoded. It may also avoid received power measurements being wrong due to a sudden reduction of the power in the slot. It may further avoid e.g. control logic at the receiver malfunctioning due to unexpected behavior of the received power. By allowing the power receiver to be in control of when reduced power time interval occurs, it allows it to effectively avoid or compensate such effects of power reductions occurring as it knows exactly when these will happen, and can ensure that they only occur when acceptable.

The power level of the power transfer signal is reduced during the reduced power time interval relative to the power transfer time interval, and typically the maximum allowable power is no less than 5, 10, or 50 times lower during the reduced power time interval than during a power transfer time interval of the power transfer phase.

The power transmitter (and typically the power receiver) may then arrange for one or more operations (functions, processes, procedures) to be performed during the reduced power time interval, i.e. it may synchronize the execution of one or more operations of the power transmitter to occur during the reduced power time interval. For example, it may typically synchronize the performance of the foreign object detection, and/or possibly communication, to occur during the reduced power time interval. In this way, it can be achieved that the impact of the power transfer and the power transfer signal on the given operation, specifically the foreign object detection and the communication, can be reduced and often minimized.

As previously described, in many embodiments, the power transmitter is arranged to switch off/decouple the drive signal from the transmitter coil 103/resonance frequency during the reduced power time intervals. Further, in many embodiments, the power receiver may be arranged to decouple the load from the receiver coil 107 such that no power is directly transferred from the power transfer signal to the load during the reduced power time intervals. In some embodiments, the decoupling may only be partial such that the effective load is reduced during the reduced power time intervals relative to outside these time intervals. In many embodiments, the loading of the power transfer signal by the power receiver may be no more than 100 mW, 200 mW, 500 mW, or 1 W during a reduced power time interval whereas the power extracting during a power transfer time interval may be higher, and typically substantially higher. In many embodiments, the power level of the power transfer signal may be no more than 100 mW, 200 mW, 500 mW, or 1 W during a reduced power time interval whereas the power level of the power transfer signal during a power transfer time interval may be higher and typically substantially higher.

In many embodiments, the reduced power time intervals may be very short and in many embodiments the reduced power time intervals has a duration of no more than 500 microseconds, 200 microseconds, or even 100 microseconds. This may provide an efficient approach where the power receiver can control the generation of very short reduced power time intervals yet which due to the reduced power time interval is sufficient to perform efficient operations such as communication or foreign object detection as described. For example, the switching off of the power transfer signal allows a decay foreign object detection to be performed and the accuracy of this may be further improved by the power receiver disconnecting the load.

In many embodiments, the power transmitter 101 further comprises a reliability circuit 209 which is arranged to determine a reliability measure for the foreign object detection test performed during the reduced power time interval. In many embodiments, the reliability circuit 209 is part of, or coupled to, the foreign object detector 207, and is arranged to determine the reliability measure based on the operation, parameter, values, and signals of the foreign object detection dependent on the details of the specific embodiment.

The reliability measure is indicative of a reliability of the foreign object detection test and specifically is indicative of reliability/certainty/confidence of the foreign object detection test result. The reliability measure may also be referred to as a confidence measure indicative of a confidence of a foreign object detection test result for a foreign object detection test performed during the reduced power time interval.

It will be appreciated that the generation of reliability/confidence values for technical tests is well known for different test and algorithms. The specific approach for determining the reliability/confidence value of the foreign object detection test depends on the specific test being performed. In many embodiments, a foreign object detection determines a parameter value based on measurements with the likelihood of a foreign object being present being monotonically dependent on the parameter value, such as being monotonically increasing or decreasing. In such embodiments, the reliability measure may be determined as the parameter value, or e.g. as a monotonic function of this.

For example, for a decay based foreign object detection, the rate of decay may be indicative of the probability of a foreign object being present and thus the rate of decay may also be used to indicate a confidence value. For example, the foreign object detection test may determine that a foreign object is present if the decay time is above a certain threshold and that no foreign object is present otherwise. Further, the confidence of the decision may be given as the numerical difference between the actual decay rate value and the threshold. Thus, if the decay time is much higher than the threshold there is a high confidence that a foreign object is present, if the decay time is much lower than the threshold there is a high confidence that no foreign object is present, and for decay times close to the threshold this may indicate that there is a foreign object detection present or not present depending on whether the threshold is exceeded or not the test result may be designated to have a low confidence/reliability.

In other foreign object detection tests, a similar approach may be used for other foreign object detection tests. For example, for a power loss test the confidence measure may be a function of how much the power loss differs from the detection threshold, for a Q-factor foreign object detection test, the confidence measure may be a function of how much the power loss differs from the detection threshold, etc.

In many embodiments, the power transmitter 101 may be arranged to transmit data to the power receiver providing information on the foreign object detection and/or on the foreign object detection reliability measure.

Specifically, in many embodiments, the power transmitter 101 may be arranged to transmit foreign object detection data to the power receiver 105 in dependence on the reliability measure.

The power transmitter be arranged to transmit a foreign object detection test result for the foreign object detection test in the reduced power time interval in response to the reliability measure for this test/result meeting a reliability criterion indicative of a reliability measure exceeding a reliability level. Thus, if the foreign object detection test results in a detection result which is considered sufficiently reliable, then the power transmitter 101 will transmit an indication of the test result to the power receiver 105. Thus, if the reliability measure is sufficiently high, the power transmitter 101 transmits data to the power receiver 105 indicating whether a foreign object has been detected or not.

In some embodiments, the power transmitter may transmit a reliability measure in response to another message, such as e.g. received power without this necessarily being a request for a reduced power interval request.

Such a reliability measure could be transmitted for the foreign object detection performed as part of the power transfer time interval, such as a power loss foreign object detection performed during the power transfer. This could indicate that a suspected foreign object detection has occurred. As will be described in more detail later, this could result in the power receiver transmitting another reduced power time interval request message leading to a more accurate foreign object detection using e.g. a decay based measurement.

In some embodiments, the power transmitter 101 may be arranged to compare the reliability measure to a reliability criterion (which may be the same or different from a reliability criterion used for determining whether to transmit the foreign object detection test result or not) and if the reliability criterion is not met, it may proceed to transmit a request for one or more reduced power time intervals.

The evaluation of the reliability criterion may result in a determination that the confidence in the foreign object detection test result is not as high as desired. For example, if the reliability measure is below a threshold, it may be determined that the foreign object detection test is not sufficiently reliable. E.g. if the decay rate is too close to the foreign object detection decision threshold, it may be determined that the foreign object detection test result is too uncertain to sufficiently clearly indicate whether a foreign object is present or not.

In this case, the power transmitter 101 may thus in some embodiments proceed to transmit the request for more reduced power time intervals to the power receiver. Thus rather than itself introducing a reduced power time interval by e.g. switching off the power transfer signal leading to load decoupling at the receiver, the power transmitter 101 proceeds to request that the power receiver 105 takes initiative to introduce one or more new reduced power time intervals by generating a new request message.

When receiving such an indication from the power transmitter 101, the power receiver 105 may proceed to evaluate if it is practical/possible for one or more new reduced power time intervals to be generated. For example, it may determine a current state of the energy reservoir to determine whether enough energy is stored to support the load during a reduced power time interval. If so, it may proceed to generate a new request for a reduced power time interval and transmit this to the power transmitter. Thus, one or more subsequent reduced power time intervals may be generated using the same approach as for the first reduced power time interval.

The power transmitter may be arranged to perform further foreign object detection tests during the subsequent reduced power time intervals resulting in a more accurate detection. The further foreign object detection tests may be separate and independent tests, and the reliability and confidence in the foreign object detection test results may be evaluated based on whether the tests in subsequent reduced power time intervals are consistent or not. In other embodiments, the foreign object detection tests may combine over different reduced power time intervals. For example, the rates of decay or power loss values may be averaged over multiple reduced power time intervals before being compared to the detection threshold.

Thus, in some embodiments, the power transmitter 101 and the power receiver 105 may interwork to dynamically and ad-hoc introduce enough reduced power time intervals to ensure that a sufficiently reliable foreign object detection result is achieved. This may be achieved while still allowing the power receiver 105 to be in control of the operation and specifically it allows the power receiver 105 to ensure that reduced power time intervals do not result in unacceptable power transfer.

In many embodiments, the communication of the reliability measure, foreign object detection test result, and or request for further reduced power time intervals may be combined. For example, a single data parameter may be transmitted with one value indicating that a reliable foreign object detection test has indicated that no foreign object is present, another value indicating that a reliable foreign object detection test has indicated that a foreign object is present, and a third value indicating that the foreign object detection test is not reliable and that further reduced power time intervals should preferably be initiated.

The power transmitter 101 may be arranged to perform other operations in response to the foreign object detection results. For example, it may in many embodiments be arranged to terminate the power transfer in response to a detection of a foreign object. If an uncertain test result is obtained, it may proceed to reduce the power level, e.g. until a new foreign object detection test is performed in a subsequent reduced power time interval. If a reliable foreign object detection test indicates that no foreign object is detected, the power transmitter may continue with the power transfer with no changes.

In some embodiments, the foreign object detector 207 may be arranged to not only perform foreign object detection during reduced power time intervals but may also be able to perform foreign object detection outside of the reduced power time intervals. Foreign object detection may in such embodiments also be performed during power transfer intervals and while power transfer is ongoing. This may provide improved performance in many embodiments and may often allow detection of foreign object faster than if foreign object is only performed during asynchronous reduced power time intervals. The approach may for example provide a combined effect of highly accurate detection during the reduced power time intervals with less accurate detection during power transfer intervals. This may allow accurate detection of even small foreign objects while at the same time allowing very quick detection of large foreign objects.

The transmitter may decide to send data to the receiver indicating the reliability of foreign object detection outside reduced power intervals. If the transmitter senses a need for more accurate foreign object detection, e.g. the reliability is low or if the transmitter suspects a foreign object, it thereby indicates such need to the receiver on which the receiver requests for a reduce power interval at a moment that suits the receiver.

For example, the foreign object detector 207 may perform a power loss foreign object detection during both the reduced power time intervals and during power transfer intervals. However, during the reduced power time intervals, a dedicated test signal can be used and the load may be decoupled thereby allowing a more accurate power loss detection performance.

In some embodiments, the power receiver may receive a reliability measure/indication of a foreign object detection (which e.g. may be one performed in a reduced power time interval or may e.g. be one performed during normal power transfer outside the reduced power time interval. The power receiver may based on the reliability criterion determine whether to request a further reduced power time interval to be generated. For example, if the reliability criterion is below a threshold, the power receiver may request a new reduced power time interval to be generated in order to allow a more accurate foreign object detection.

In some embodiments, both the power receiver and the power transmitter may evaluate the reliability measure. For example, a power transmitter may compare the reliability measure to a criterion in order to decide whether to request more reduced power time intervals and in addition it may transmit the reliability measure to the power receiver which may also perform an evaluation e.g. in order to determine whether it will follow the request. For example, the power receiver may only follow the request if the power receiver considers the reliability to be below a given threshold and otherwise it may reject the request. As another example, the threshold for not transmitting a request for a new reduced power time interval may be substantially higher if the power transmitter transmits a request for a new reduced power time interval than if it does not.

Such approaches may e.g. allow a more complex decision process where the power receiver proceeds to generate a request for a further reduced power time interval only if the reliability measure meets both a power transmitter implemented criterion and a power receiver implemented criterion. The approaches may typically allow the operation of requesting reduced power time intervals to be adapted to the specific pairing of the specific power receiver and the specific power transmitter (e.g. new reduced power time intervals may only be generated if both the power receiver and power transmitter considers this to be desirable).

In some embodiments, the power transmitter further comprises a calibrator which is arranged to perform a calibration of a foreign object detection where the calibration depends on the foreign object detection test.

In some embodiments, whether the calibration is performed or not may depend on the foreign object detection test. Specifically, it may depend on whether a foreign object is detected or not, and typically the calibration is performed only if the foreign object detection test indicates that no foreign object is present.

In many embodiments, the reliability of the foreign object detection test may also be taken into account. For example, the calibration may only be performed if the foreign object detection test determines that no foreign object is present with a reliability measure that indicates a sufficiently high confidence in this being a correct determination. The reliability threshold for performing the calibration may be different from reliability thresholds for other purposes, such as e.g. the threshold for transmitting a request for further reduced power time intervals.

In some embodiments, the calibrator 211 may be arranged to calibrate the reduced power time interval foreign object detection itself, i.e. it may be arranged to calibrate the algorithm used during the reduced power time interval itself. In other embodiments, the calibrator 211 may be arranged to adapt/calibrate another foreign object detection, such as a foreign object detection algorithm performed during power transfer time intervals. For example, if an accurate foreign object detection is performed during a reduced power time interval it may be determined with very high reliability that no foreign object is present (or that any foreign object present will have a very small impact). Immediately following the reduced power time interval and the resumption of the power transfer, a foreign object detection test and the calibrator 211 may proceed to amend the foreign object detection such that it more accurately will reflect that no foreign object is present. For example, for a power loss foreign object detection, the power loss measured immediately after a reduced power time interval is extremely likely to be due to losses in the power transmitter and the power receiver itself (e.g. in metallic parts of these). The calibrator 211 may accordingly proceed to introduce an offset to the power loss estimate that cancels/compensates for this power loss. The compensation/offset is then introduced for subsequent foreign object detection tests during the power transfer intervals.

Thus, in many embodiments, the calibration is arranged to calibrate foreign object detection performed during a power transfer time interval/outside the reduced power time intervals.

The calibration may be an operation that changes a parameter of the foreign object detection operation, and specifically the calibration may be arranged to adapt the foreign object detection algorithm to the current operating point/scenario. For example, it may compensate for variations in component values, relative positions between the power transmitter and power receiver, properties of the power transmitter and/or power receiver, power levels, etc. As another example, the average decay rate for a signal at the start of reduced power time interval may be measured and averaged over a plurality of foreign object detection test indicative of no foreign object being present and the decision criterion may be adapted to reflect the average value. This may for example allow a foreign object detection algorithm in the reduced power time interval to be adapted to be more critical and to be able to detect smaller variations from the current operating point when no foreign object is present.

In many embodiments, the power transmitter may as described be able to perform foreign object detection during both the reduced power time intervals and during power transfer time intervals, and the calibrator 211 may be arranged to adapt the foreign object detection being performed during power transfer time intervals in dependence on the outcome of the foreign object detection test during the reduced power time interval.

In typical embodiments, the foreign object detection performed during a power transfer time interval is thus different from that performed during the reduced power time intervals.

In some embodiments, the same underlying foreign object detection operation may be performed, and the difference may be that different detection criteria are applied. For example, a power loss may be determined for both the reduced power time interval and power transfer time interval foreign object detection, but the measured power losses may be compared to different detection thresholds. The detection threshold of one or both foreign object detections may be adapted by the calibrator 211.

In many embodiments, different types of tests may be used for the foreign object detection during power transfer time intervals and during reduced power time intervals. Specifically, different parameters may be determined and evaluated to determine whether a foreign object is present or not.

As an example, in many embodiments, the foreign object detector 207 may perform power loss during power transfer time intervals but perform decay based foreign object detection or Q-factor foreign object detection during reduced power time intervals. This may provide a particularly advantageous performance in many embodiments where the different foreign object detection algorithms are optimized or adapted to the properties/conditions in the different phases. Specifically, the decay measurement may allow highly accurate and very short foreign object detection but requires that the power transfer signal is switched off. It may thus be highly suitable for short reduced power time intervals. In contrast, the power loss tend to be highly accurate for foreign object detection at higher sustained power levels, especially when accurately calibrated and adapted to the specific current conditions. Non-decay-based Q factor methods can deliver high accuracy, but may require longer time at which the power transfer is switched off. Thus, the combination of different foreign object detection algorithms (whether just using different criteria or fundamentally different operations) may provide highly accurate foreign object detection throughout the power transfer phase, and the adaptation of the power transfer time interval operation based on the foreign object detection test during the reduced power time intervals may allow for substantially improved performance.

As a specific example, the power receiver may request a reduced power time interval and in response the power transmitter may proceed to switch off the drive signal and perform a decay rate foreign object detection test. If this detects a foreign object with a high reliability, the power transfer may be terminated (e.g. subject to further foreign object detection tests indicating that a foreign object is present). If it detects with a high reliability/confidence measure that a foreign object is not present, it may initiate the calibrator 211 to perform a calibration of the foreign object detection in the subsequent power transfer time interval. In this example, when the power transfer signal is switched back on and the power transfer time interval initiates, the calibrator 211 performs measurements and adapts the foreign object detection algorithm performed during the power transfer time interval based on these measurements. Thus, the power transfer foreign object detection algorithm is adapted based on the assumption that no foreign object has been detected. For example, for a power loss detection, the current power loss, which is a power loss with no foreign object present, is measured and the decision threshold is adapted accordingly (or a compensation factor is introduced to the power loss).

If the reliability of the decay rate based foreign object detection test during the reduced power time interval results in a detection that no foreign object is present but the reliability is low, the system may be arranged to continue with the power transfer but the calibrator 211 may be arranged to not calibrate the foreign object detection algorithms. This may reduce the risk of the calibration potentially adapting the foreign object detection to a situation where a foreign object is actually present. For example, if a small foreign object is present at some distance, it may not lead to unacceptable power loss and therefore be an acceptable situation. However, it will result in a less reliable detection of no foreign object being present (the parameter will be closer to the detection threshold) and this may prevent the calibrator 211 from calibrating the foreign object detection to a situation where a small foreign object is actually present.

In some embodiments, the operation of the power transmitter in response to a reduced power time interval foreign object detection test may thus depend both on the detection result of whether a foreign object (FO) is present or not. E.g. the following approach may be adopted:

Reliable+FO detected: stop/reduce/limit power transfer
Reliable+No FO detected: calibrate. Additional data may be exchanged for supporting the calibration itself
Not reliable: postpone calibration. Additional reduced power intervals may be requested.

The approach may thus allow improved interaction between two foreign object detection algorithms where the first algorithm (the one of the reduced power time intervals) is typically a substantially more reliable detection than the second algorithm (the one of the power transfer time interval). The accurate/reliable detection algorithm can be used to indicate with high confidence that no foreign object is present and that therefore the less accurate/reliable detection algorithm can be calibrated under this assumption. A substantially more accurate overall foreign object detection can typically be achieved.

Although in many embodiments, the calibration of the foreign object detection during the power transfer time interval may depend on the foreign object detection test during the reduced power time interval to the extent that calibration is only performed if no foreign object is detected (and possibly also requiring a reliability measure above a threshold), it may in other embodiments depend on the test result and reliability in more complex ways. For example, in some embodiments a degree of calibration/adaptation may depend on the reliability measure. E.g. the calibration may be arranged to adapt a detection threshold by a relative offset from a current level. The size of the offset may depend on the reliability measure and thus for a detection that no foreign object is present with a high confidence, the change in the detection threshold may be larger than if the confidence is lower.

In some embodiments, the first communicator 205 may be arranged to alternatively or additionally communicate with the power receiver during the reduced power time interval. The communication may in some embodiments use the power transfer signal and/or the transmitter coil 103. In such embodiments, the drive signal may e.g. be generated with a frequency identical to the one used during the power transfer time intervals and this drive signal may be modulated to transmit data.

In other embodiments, communication may be performed using different a different antenna/transmit coil than the transmitter coil 103. Also, the first communicator 205 may use a communication carrier different from the power transfer signal, and typically one with a different frequency.

In many embodiments, the communication may be a completely separate communication system, and may specifically be a standardized short range communication system, such as e.g. a Near Field Communication (NFC) system.

In the described system, the communication is during the power transfer phase performed in reduced power time intervals. Specifically, some or indeed all of the reduced power time intervals may be communication time intervals in which communication between the power transmitter 101 and the power receiver 105 is performed. Specifically, the transmitter controller 203 may comprise a communication control functionality which is arranged to synchronize the first communicator 205 such that the communication operation (typically both receiving and transmitting data) is performed in (and typically only in) the communication time intervals of the power transfer phase, i.e. in the reduced power time intervals that are assigned for communication.

In many embodiments, the first communicator 205 is arranged to transmit data to the power receiver 105, and may specifically be arranged to modulate the power transfer signal using frequency, amplitude, or phase modulation. This may in some embodiments be done during the reduced power time intervals where for example a low and constant level is set for the drive signal/power transfer signal which may result in e.g. improved detection of amplitude variations resulting from amplitude modulation.

In some embodiments, communication may be performed using a separate communication channel which may be achieved using a separate communication coil, or indeed using the transmitter coil 103. For example, in some embodiments Near Field Communication may be implemented or a high frequency carrier (e.g. with a carrier frequency of 13.56 MHz) may be overlaid on the power transfer signal.

This may substantially improve communication performance, and specifically it may provide an environment providing improved communication with less interference caused from the power transfer operation. Further, as the power transfer time intervals are controlled by the power receiver, an ad-hoc power receiver controlled dynamic and asynchronous communication operation can be achieved In many embodiments, the reduced power time interval may comprise both a communication time interval and a foreign object detection time interval.

In the described systems, operations such as foreign object detection and/or communication may be performed in the reduced power time intervals, and thus the foreign object detection/communication and the power transfer may be separated in the time domain thereby resulting in reduced cross-interference from the power transfer to the foreign object detection/communication. Thus, the variability and uncertainty resulting from variations in the operating conditions for the power transfer can be isolated from the foreign object detection/communication resulting in a more reliable and accurate foreign object detection/communication.

In the power transfer phase, the power transmitter is thus arranged to perform power transfer during power transfer time intervals. Specifically, during these time intervals, the power transmitter may provide information to the power receiver with a much higher bitrate, which would otherwise lead to an overload on the low bitrate communication in the power transfer intervals. The power transmitter and power receiver may (re-)negotiate new operating parameters such as the guaranteed power level. The power transmitter and the power receiver may also operate a power control loop (the power control loop may be based on communication within communication time intervals corresponding to reduced power time intervals). Thus, the level of the power being transferred may be dynamically varied.

The approach of using reduced power time intervals for the communication may thus provide substantially improved communication in many embodiments. Further, by allowing the reduced power time intervals to be power receiver controlled dynamic and ad hoc/asynchronous time intervals, a more efficient and adaptive approach can be achieved allowing the reduced power time intervals to be adapted to the specific needs, requirements, and preferences of the individual power receiver, including specifically ensuring that the reduced power time interval do not jeopardize reliable power supply to the load.

The power receiver may in different embodiments use different conditions and triggers to transmit a reduced power time interval request message to the power transmitter.

In many embodiments, the power receiver may be arranged to transmit a reduced power time interval request message in response to a change in the power being extracted from the power transfer signal, in current being provided to the load, and/or in the voltage being provided to the load. The change may be an actual change that is detected or has happened or may e.g. be an upcoming change, i.e. the power receiver may transmit the reduced power time interval request message in advance of implementing the change.

As an example, a power receiver may sometimes change operating point such that a different power, current, and/or voltage is provided to the load. In particular, it may change the operating mode to a different power transfer to the load, such as for example when changing a charging of a battery from fast charging, to normal, or trickle charging.

The different power levels for such operating modes may result in different impact on the power transfer signal and this may again affect the foreign object detection test during the power transfer time interval. For example, changing the power provided to the load may result in a very different power loss being measured at the power transmitter even if no foreign object is present. Therefore, it may be desirable to recalibrate the foreign object detection test and accordingly a reduced power time interval request message may be generated and transmitted to the power transmitter resulting in this initiating a new reduced power time interval and performing a foreign object detection test during the reduced power time interval, such as e.g. a decay rate test. If this results in a reliable indication of no foreign object being present, the power transmitter may proceed to perform a calibration of the power transfer time interval foreign object detection algorithm at the end of the reduced power time interval.

Such an approach is not limited to changes in power level but may also be applied when changing between operating modes for the same power level. For example, the power receiver may have the following operating modes:

Operating mode 1: The power receiver provides 5 W, 5V, 1 A to the load.

Operating mode 2: The power receiver provides 5 W, 10V, 0.5 A to the load.

The assessment of its received power may be different for the two modes and possibly also the assessment of the transmitted power. The calculated power loss may be different in the different operating modes, and the power receiver may be arranged to transmit a reduced power time interval request message when switching between these, resulting in a new reduced power time interval and foreign object detection calibration being performed.

The system may behave differently depending on whether the power level changes or not. In many embodiments, the foreign object detection may utilize a calibrated power loss curve which shows an expected power loss for different power levels of the power transfer signal when no foreign object is present.

In case of a relatively small change of power level (typically with no operating mode change at the receiver), the current calibrated power loss curve can typically be reused and extended/improved with new power level(s). However, for a change of operating mode (typically including a change of the nominal voltage and/or current provided to the load), the power loss curve should be renewed, thereby using multiple (2 or more) power loss values. For each operating mode, a different power loss curve may be maintained.

In some embodiments, the power transmitter may be arranged to transmit a request for measurements and/or an indication of a suspected detection of a foreign object, and the power receiver may be arranged to transmit the request for a reduced power time interval in response to receiving the indication from the power transmitter.

In some embodiments, the power transmitter may be arranged to transmit the indication by transmitting a non-acknowledge (NACK) response to a message received from the power receiver. This message may be a power transfer message, such as specifically a received power or a power control loop error message.

The power transmitter may be arranged to transmit the indication of the suspected detection of the foreign object in response to a result of a foreign object detection test, and specifically a foreign object detection test performed during a power transfer time interval.

The power transmitter may specifically in some embodiments transmit the indication of a suspected detection of a foreign object in response to a determination that the foreign object detection test did not result in a determination of no foreign object being present with a reliability measure meeting a reliability criterion.

The power transmitter may specifically in some embodiments transmit the indication of a suspected detection of a foreign object in response to a determination that a reliability measure for the foreign object detection test does not meet a reliability criterion.

In some embodiments, the power receiver may thus request a reduced power time interval when it receives an indication from the power transmitter to make measurements. This may specifically occur when the power transmitter suspects the presence of a foreign object, e.g. almost reaching the threshold of foreign object detection, or occasionally (e.g. for a single measurement event) exceeding the threshold of foreign object detection.

In response to receiving an indication of a suspected foreign object detection, the power receiver may e.g. control the power transfer to a lower level thereby mitigating the potential heating of a foreign object.

Alternatively or additionally, it may initiate a more accurate test for the presence of a foreign object. In such an example, the power receiver may enable the power transmitter to perform a more accurate test by requesting a reduced power time interval which results in the power transmitter performing an accurate foreign object detection test, such as e.g. a decay rate test. In some embodiments, the reduced power time interval request message may additionally or alternatively initiate a new calibration as previously described.

Specifically, a NAK transmitted as response to a received power message could indicate that the receiver should take action, such as e.g. reduce its power consumption or request calibration, and in particular request a new reduced power time interval request message.

In an approach where the control of the operation is fully with the power receiver, the power transmitter is dependent on the acceptable operation of the power receiver in requesting reduced power intervals. However, this may also have associated challenges. For example, it may be difficult to ensure that sufficient compliance testing has been performed on such an option for the power receiver.

One approach may be to require that the power receiver enables the power transmitter to keep the power difference within a more strict range (i.e. a lower power loss) than originally required. This puts an implicit requirement on the power receiver enabling the power transmitter to calibrate the power difference, as it otherwise is typically not practicable to achieve the stricter range.

In many systems, the power transmitter may acknowledge/non-acknowledge messages from the power receiver. A non-acknowledge NAK may also be used by the power transmitter to warn the power receiver of the (potential) presence of a foreign object. This means that if the power receiver does not take action, the power transmitter may stop power transfer. An action of the power receiver may be to reduce its power level demand thereby mitigating the potential hazard of heating up a foreign object.

Another approach may be for the power receiver to request a reduced power time interval request message to enable the power transmitter to perform a more accurate foreign object detection.

The NAK of the power transmitter could in this context be regarded as indication that the reliability/accuracy of foreign object detection is insufficient and therefore may stop power transfer.

A smart power receiver can therefore request a reduced power time interval to enable the power transmitter to perform a more accurate foreign object detection test and/or to perform a calibration on the power difference.

The power receiver may be arranged to request a reduced power interval in response to receiving a NAK response from the power transmitter.

In some embodiments, the power receiver may also be arranged to perform calibration. For example, if the power receiver receives a reliability indication for a reduced foreign object detection test from the power transmitter. If the information indicates that no foreign object is present with a sufficiently high probability, the power receiver may proceed to calibrate a received power level measurement.

In such a case, the power transmitter may e.g. transmit measurements/estimations of transmitted power and the power receiver may use this to calibrate its received power in order to compensate the difference between them.

In some embodiments, the power receiver may be arranged to transmit reduced power time interval request messages with a maximum duration between them. For example, the maximum duration between two reduced power time intervals may be 100 ms, 500 ms, 1 second, or 2 seconds. In such embodiments, the power receiver may e.g. transmit a reduced power time interval request message whenever a change of operating mode occurs but if no change occurs a reduced power time interval request message may anyway be sent with a predetermined interval of, e.g. 500 msecs.

In some embodiments, the reduced power time interval request message may be a dedicated message that is used only for the purpose of requesting the reduced power time interval. The message may for example simply consist in a predetermined pattern of bits which if detected by the first communicator 205 of the power transmitter is interpreted as a request for the power transmitter to generate a reduced power time interval.

In some embodiments, a reduced power time interval request message may comprise data related to the reduced power time interval, such as a suggested timing of this, a required maximum or minimum power level, a duration, a number of required reduced power time intervals etc. etc. Such data may be provided both as part of a dedicated message as well as part of a combined message or a message also used for other purposes. The power transmitter may in such embodiments be arranged to generate the reduced power time interval with such properties.

Thus, in some embodiments, the reduced power time interval request message is a separate message that is used only for specific purpose of requesting a reduced power time interval. However, in some embodiments, the reduced power time interval request message may be a combined message and specifically the request for a reduced power time interval may be piggybacked onto another existing message typically used for other purposes.

In some embodiments, the reduced power time interval request message is a message that comprises other data for the power transfer where this data relates to a power transfer operation that is performed outside of the reduced power time interval. The reduced power time interval request message may comprise data that relates to a power transfer time interval operation. As a specific example, the reduced power time interval request message may be a power control message that comprises control data for a power control loop for the power transfer signal.

Thus, rather than being a dedicated or separate message, the reduced power time interval request message may for example be a power control error message. Such messages may be transmitted frequently such as each 250 msec or faster. Many such messages may not include any reduced power time interval request but may just report power control requests, such as a power up or power down requests. However, some messages may include a data sequence which is interpreted as a request for a reduced power time interval.

In many embodiments, the reduced power time interval request message may be a power feedback message which comprises data indicative of a power level extracted by the power receiver. The power feedback message may typically comprise data indicative of an amount of power extracted by the power receiver from the power transfer signal. The power feedback message may specifically be a received power data packet indicative of a power extracted (or to be extracted) from the power transfer signal by the power receiver.

It will be appreciated that many different (existing) control messages may be modified to also function as a reduced power time interval request message to trigger a reduced power time interval. Examples include:
Received power data packet
Use a specific mode or a reserved field to act as a reduced power time interval request message (also referred to as a trigger)
Determine which of the modes also act as a trigger
All received power data packets act as a trigger, regardless of the mode
Data packets in a negotiated set act as a trigger
A newly defined data packet acts as a trigger
This data packet may also contain the actual slot start time and/or slot duration As a specific example, the reduced power time interval request message may be implemented as a Received Power Packet as known from Qi systems. Such a data packet has a format as shown in FIG. 8.

The bit pattern in the field referred to as Mode provides additional information with respect to the Received Power Value. This field may be modified such that a specific bit pattern is also interpreted as a reduced power time interval request. For example, the following bit patterns may be defined, i.e. the bit pattern of '101' indicates that the Received Power Packet message is also a reduced power time interval request message.

| Mode | Description |
| --- | --- |
| '000' | Normal value; Response requested |
| '001' | Light-load calibration value; Response requested |
| '010' | Connected-load calibration value; Response requested |
| '011' | Reserved |
| '100' | Normal value; no Response expected |
| '101' | Normal value; trigger for FOD slot; no Response expected |
| '110' | Reserved |
| '111' | Reserved |

In another example a bit pattern of '011' may be defined that includes a request for a response from the transmitter. The response can be the reliability measure as described previously.

| Mode | Description |
| --- | --- |
| '000' | Normal value; Response requested |
| '001' | Light-load calibration value; Response requested |
| '010' | Connected-load calibration value; Response requested |
| '011' | Normal value; trigger for FOD slot; Response expected |
| '100' | Normal value; no Response expected |
| '101' | Reserved |
| '110' | Reserved |
| '111' | Reserved |

In many embodiments, there may be a direct correspondence between reduced power time interval request messages and reduced power time intervals such that each reduced power time interval request message results in the power transmitter generating one and only one reduced power time interval request message.

In some embodiments, reduced power time interval may only be generated in response to a reduced power time interval request message received from the power receiver and thus the power receiver can rely on no reduced power time interval occurring unless specifically requested.

In some embodiments, it is possible that more than one reduced power time interval may be generated by the power transmitter in response to the receipt of a single reduced power time interval request message. For example, in some embodiments, the receipt of a reduced power time interval request message may result in the power transmitter generating a predetermined number of reduced power time intervals which e.g. may have a predetermined duration and a predetermined interval. Thus, rather than a single reduced power time interval request message resulting in the generation of a single reduced power time interval, it may result in the generation of a sequence or burst of potentially short reduced power time intervals.

In some embodiments, the parameters of the reduced power time intervals and the response to a reduced power time interval request message may be predetermined, for example the duration of a reduced power time interval may be predetermined. However, in other embodiments, one, some or more may be dynamically determined e.g. in response to data received in the reduced power time interval request message. The reduced power time interval request message may for example indicate a requested number and duration of reduced power time intervals.

In many embodiments, one or more parameters of the reduced power time interval or the request process may be defined or determined during an initialization phase performed prior to the system entering the power transfer phase. For example, many wireless power transfer systems, such as e.g. Qi, include a negotiation phase which is performed as part of the initialization of a power transfer phase. In such a phase, the power receiver may request desired operational parameters or aspects, and the power transmitter may agree or disagree with these requests. The power transfer may then proceed using the negotiated parameters.

In the described system, an initialization phase, and specifically a negotiation phase, may be used to initialize parameters of the reduced power time interval operation.

Such a phase may be used to determine whether the power transmitter and power receiver can indeed support such operation, and if so, how the operation should be implemented. It may determine whether reduced power time intervals are supported at all, whether only predetermined periodic reduced power time intervals based on a predetermined repeating time frame is supported, or whether a full power receiver controlled reduced power time interval operation is supported.

In the latter case, the negotiation may further be used to determine which messages may be used as a reduced power time interval request message, such as whether the Received Power Packet can be used, whether a dedicated message can be used etc.

Such an approach may allow improved flexibility and may in particular in many systems allow improved backwards compatibility and may enable introduction of the described approach into an existing deployed system.

The initialization/configuration/negotiation phase may additionally or alternatively determine parameters of the reduced power time intervals, such as a timing aspect (e.g. the delay from the reduced power time interval request message to the start of the reduced power time interval), a duration, a maximum power level etc. In some embodiments, such negotiated parameters may be default parameters which can subsequently be overwritten e.g. by dedicated data included in the reduced power time interval request messages.

As a specific example in the negotiation (or configuration/negotiation) phase, the power receiver can indicate whether it supports slotted operation (foreign object detection and/or communication)
reduced power time interval request messages (slot triggers)
implicit slot triggers
explicit slot triggers In the power transfer phase, the power transmitter can use this information to modify its behavior as shown in the following:

| Slotted FOD/Com | Slot triggers | Meaning |
| --- | --- | --- |
| no | X | Do not allow slotted FOD/communication. The power transmitter may limit the amount of power it is willing to provide. |
| yes | no | Allow slotted FOD. The power receiver does not provide triggers. The power transmitter may generate based on general rules. Optionally, those rules may be negotiated but the power receiver, and govern parameters such as the slot duration and slot interval time. |
| yes | yes | Applies slotted FOD/communication using triggers received from the power receiver. The power receiver sends these triggers according negotiated rules (comprising e.g. a slot duration and a slot interval time). The transmissions of specific data packets serve as triggers. |

Configuration Phase

The power receiver can use reserved bits in the configuration data packet to indicate its support for slotted FOD (according to the table above)

Negotiation Phase

The power receiver can use information messages in the negotiation phase to indicate its support for slotted FOD/communication It can also use messages to negotiate slot duration and slot interval Moreover, it can use messages to indicate how it will generate triggers (reduced power time interval request messages)

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

It will be appreciated that the reference to a preferred value does not imply any limitation beyond it being the value determined in the foreign object detection initialization mode, i.e. it is preferred by virtue of it being determined in the adaptation process. The references to a preferred value could be substituted for references to e.g. a first value.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A power transmitter comprising:
a transmitter coil, wherein the transmitter coil is arranged to generate a power transfer signal during a power transfer phase;
a driver circuit,
wherein the driver circuit is arranged to generate a drive signal for the transmitter coil,
wherein the drive signal is arranged to cause the power transfer signal from the transmitter coil during the power transfer phase;
a first communicator circuit, wherein the first communicator circuit is arranged to receive messages from a power receiver;
a controller circuit, wherein the controller circuit is arranged to generate a reduced power time interval during the power transfer phase,
wherein a power level of the power transfer signal is reduced during the reduced power time interval,
wherein the controller circuit is arranged to generate the reduced power time interval in response to receiving a reduced power time interval request message from the power receiver;
a foreign object detector circuit,
wherein the foreign object detector circuit is arranged to perform a foreign object detection,
wherein the foreign object detection is arranged to perform the foreign object detection during the reduced power time interval; and
a reliability circuit,
wherein the reliability circuit is arranged to determine a reliability measure for the foreign object detection,
wherein the reliability circuit is arranged to transmit a request for at least one reduced power time interval to the power receiver in response to the foreign object detection.

2. The power transmitter of claim 1, wherein the reliability circuit is arranged to transmit a request for at least one reduced power time interval to the power receiver in response to a determination that the reliability measure for a foreign object detection test does not meet a reliability criterion.

3. The power transmitter of claim 1, wherein the first communicator circuit is arranged to communicate with the power receiver during the reduced power time interval.

4. The power transmitter of claim 3,
wherein the first communicator circuit is arranged to communicate with the power receiver using a communication method,
wherein the communication method does not use the power transfer signal.

5. The power transmitter of claim 1, wherein the reduced power time interval request message is a dedicated message for the purpose of requesting the reduced power time interval.

6. The power transmitter of claim 1,
wherein the reduced power time interval request message comprises a power transfer operation data,
wherein the power transfer operation data is used for power transfer performed outside of the reduced power time interval.

7. The power transmitter of claim 6,
wherein the reduced power time interval request message is a power control message,
wherein the power control message provides feedback for controlling the power transfer signal.

8. The power transmitter of claim 6,
wherein the reduced power time interval request message is a power feedback message,
wherein the power feedback message comprises power level data,
wherein the power level data is indicative of a power level extracted by the power receiver.

9. The power transmitter of claim 6, wherein the reduced power time interval request message is a reserved field of a received power data packet.

10. The power transmitter of claim 6, wherein the reduced power time interval request message comprises at least one of a reduced power time interval start time and a reduced power time interval duration.

11. The power transmitter of claim 6,
wherein at least a portion of the reduced power time interval request message comprises a mode of operation for the power transfer,
wherein the mode is one of a plurality of modes of operation,
wherein the plurality of modes of operation comprise a reduced power time interval mode of operation.

12. The power transmitter of claim 1, further comprising an initialization processor,
wherein the initialization processor is arranged to initialize the power transfer phase prior to the start of the power transfer phase,
wherein the initialization processor is arranged to determine a property of the reduced power time interval in response to a communication with the power receiver, wherein the controller circuit is arranged to generate the reduced power time interval with the property.

13. A method of operation for a power transmitter providing power to a power receiver; the method comprising:
generating a power transfer signal during a power transfer phase;
receiving messages from the power receiver during the power transfer phase;
generating a reduced power time interval during the power transfer phase, wherein a power level of the power transfer signal is reduced during the reduced power time interval; and
generating the reduced power time interval in response to receiving a reduced power time interval request message from the power receiver
performing a foreign object detection during the reduced power time interval;
determining a reliability measure for the foreign object detection; and
transmitting a request for at least one reduced power time interval to the power receiver in response to the foreign object detection.

14. A computer program stored on a non-transitory medium, wherein the computer program when executed on a processor performs the method as claimed in claim 13.

15. The method of claim 13, further comprising communicating with the power receiver during the reduced power time interval.

16. The method of claim 15, further comprising communicating with the power receiver using a communication method, wherein the communication method does not use the power transfer signal.

17. The method of claim 13, wherein the reduced power time interval request message is a dedicated message for the purpose of requesting the reduced power time interval.

18. The method of claim 13,
wherein the reduced power time interval request message comprises a power transfer operation data,
wherein the power transfer operation data is used for power transfer performed outside of the reduced power time interval.

19. The method of claim 18,
wherein the reduced power time interval request message is a power control message,
wherein the power control message provides feedback for controlling the power transfer signal.

20. The method of claim 18,
wherein the reduced power time interval request message is a power feedback message,
wherein the power feedback message comprises power level data,
wherein the power level data is indicative of a power level extracted by the power receiver.

21. The method of claim 18, wherein the reduced power time interval request message is a reserved field of a received power data packet.

22. The method of claim 18, wherein the reduced power time interval request message comprises at least one of a reduced power time interval start time and a reduced power time interval duration.

23. The method of claim 18,
wherein at least a portion of the reduced power time interval request message comprises a mode of operation for the power transfer,
wherein the mode is one of a plurality of modes of operation,
wherein the plurality of modes of operation comprise a reduced power time interval mode of operation.

24. The method of claim 13, further comprising:
initializing the power transfer phase prior to the start of the power transfer phase;
determining a property of the reduced power time interval in response to a communication with the power receiver; and
generating the reduced power time interval with the property.

25. A power transmitter comprising:
a transmitter coil, wherein the transmitter coil is arranged to generate a power transfer signal during a power transfer phase;
a driver circuit,
wherein the driver circuit is arranged to generate a drive signal for the transmitter coil,
wherein the drive signal is arranged to cause the power transfer signal from the transmitter coil during the power transfer phase;
a first communicator circuit, wherein the first communicator circuit is arranged to receive messages from a power receiver;
a controller circuit, wherein the controller circuit is arranged to generate a reduced power time interval during the power transfer phase,
wherein a power level of the power transfer signal is reduced during the reduced power time interval,
wherein the controller circuit is arranged to generate the reduced power time interval in response to receiving a reduced power time interval request message from the power receiver;
a foreign object detector circuit,
wherein the foreign object detector circuit is arranged to perform a foreign object detection,
wherein the foreign object detector circuit is arranged to perform the foreign object detection during the reduced power time interval; and
a reliability circuit,
wherein the reliability circuit is arranged to determine a reliability measure for the foreign object detection,
wherein the reliability circuit is arranged to transmit a foreign object detection result to the power receiver in response to a determination that the reliability measure for a foreign object detection test meets a reliability criterion.

26. A method of operation for a power transmitter providing power to a power receiver; the method comprising:
generating a power transfer signal during a power transfer phase;
receiving messages from the power receiver during the power transfer phase;
generating a reduced power time interval during the power transfer phase, wherein a power level of the power transfer signal is reduced during the reduced power time interval; and
generating the reduced power time interval in response to receiving a reduced power time interval request message from the power receiver;
performing a foreign object detection during the reduced power time interval;
determining a reliability measure for the foreign object detection; and
transmitting a foreign object detection result to the power receiver in response to a determination that the reliability measure for a foreign object detection test meets a reliability criterion.

* * * * *